United States Patent Office 3,562,305
Patented Feb. 9, 1971

3,562,305
STABILIZED COMPOSITIONS OF ORGANOTIN-(CARBOXYORGANO MERCAPTIDES) AND DIORGANOTIN BIS(CARBOXYLATES) AND THE PREPARATION THEREOF
Samuel Hoch, Brooklyn, N.Y., assignor to Tenneco Chemicals, Inc., a corporation of Delaware
No Drawing. Original application Oct. 5, 1967, Ser. No. 673,007. Divided and this application Sept. 9, 1969, Ser. No. 856,486
Int. Cl. C07f 7/22; C08f 45/62
U.S. Cl. 260—429.7          15 Claims

ABSTRACT OF THE DISCLOSURE

A stabilizer for vinyl halide resin compositions comprises an organotin mercaptoacid ester, such as dibutyltin bis-(isooctyl thioglycolate), and a small amount of an organotin carboxylate, such as dibutyltin dipelargonate or dibutyltin bis-(monoisooctyl maleate). These stabilizers, which, unlike the untreated organotin mercaptoacid esters, do not decompose rapidly on standing at room temperature, are at least as effective as stabilizers for vinyl halide resin compositions as the organotin mercaptoacid esters.

---

This is a division of my copending application Ser. No. 673,007, which was filed on Oct. 5, 1967. This invention relates to stabilizers for halogen-containing resins and to resinous compositions stabilized therewith. More particularly, it relates to stabilizers for vinyl halide resin compositions that comprise an organotin mercaptoacid ester and an organotin carboxylate.

Organotin mercaptoacid esters, which are condensation products of esters of mercaptoacids with organotin halides or oxides, are known to be excellent stabilizers for vinyl halide resin compositions. The preparation of these compounds and their use as stabilizers for vinyl halide resin compositions are described in detail in U.S. Pat. 2,641,588 (Leistner and Knoepke), U.S. Pat. 2,641,596 (Leistner and Hecker), and U.S. Pat. 2,648,650 (Weinberg and Johnson). The use of these compounds as stabilizers for vinyl halide resins has been limited to a large extent by their instability. On standing for as little as one day at room temperature, the organotin mercaptoacid esters start to decompose to form crystalline thioglycolates and other compounds that are not useful as stabilizers for vinyl halide resin compositions. Various materials have been proposed as preservatives for the organotin mercaptoacid esters, but none has proven to be entirely satisfactory for this purpose. For example, the addition of polyvalent metal salts of weak carboxylic acids, such as calcium 2-ethyl-hexoate or zinc naphthenate, to an organotin mercaptoacid ester inhibits its decomposition on standing, but has an adverse effect on its ability to stabilize vinyl halide resin compositions.

In accordance with the present invention, it has been found that the incorporation into an organotin mercaptoacid ester of a small amount of an organotin carboxylate as hereinafter defined yields products that have a substantially reduced tendency to decompose on standing and that are at least as effective as the untreated organotin mercaptoacid esters as stabilizers for vinyl halide resin compositions.

The organotin mercaptoacid esters that may be stabilized in accordance with this invention include those disclosed in U.S. Pat. 2,641,588, U.S. Pat. 2,641,596, and U.S. Pat. 2,648,650. These compounds have the structural formula $$R_nSnX_{4-n}$$

wherein R represents an alkyl, oxyalkyl, aryl, oxyaryl, aralkyl or cycloalkyl group, X represents an ester of a mercaptoacid having from 2 to 6 carbon atoms, whose sulfur atom is linked to the tin atom, and n is a number in the range of 1 to 3. Illustrative of these compounds are the following: monobutyltin tris-(cyclohexyl thioglycolate), dihexyltin bis-(hexyl thiopropionate), triphenyltin butyl thiovalerate, tricyclohexyltin benzyl thiocaproate, and the like. The invention is of particular value in the stabilization of alkyltin thioglycolates that have the structural formula $$R°_nSn(SCH_2COOR')_{4-n}$$

wherein R° represents an alkyl group having from 4 to 8 carbon atoms, R' represents an alkyl, aryl, aralkyl, alkaryl, or cycloalkyl group, and n is a number in the range of 1 to 3. These include, for example, dibutyltin bis-(butyl thiglycolate), tributyltin isooctyl thioglycolate, octyltin tris-(benzyl thioglycolate), dibutyltin bis-(cyclohexyl thioglycolate), and the like.

The organotin carboxylates that may be used as stabilizers for the organotin mercaptoacid esters have the structure

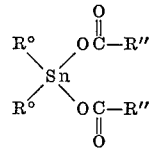

wherein each R° represents an alkyl group having from 4 to 8 carbon atoms, each R″ represents an alkyl group having from 8 to 17 carbon atoms, an alkenyl group having from 8 to 17 carbon atoms, or the group

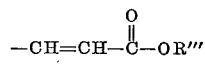

and R‴ represents an alkyl group having from 1 to 18 carbon atoms, a cycloaliphatic group, an alkenyl group having from 2 to 18 carbon atoms, or an aralkyl group.

Illustrative of these organotin carboxylates are the following: dibutyltin dipelargonate, dibutyltin dilaurate, dibutlytin distearate, dihexyltin dioleate, dioctyltin ditallate, dioctyltin diundecylenate, dibutyltin bis-(neodecanoate), dioctyltin bis-(neotridecanoate), dibutyltin bis-(monomethyl maleate), dihexyltin bis-(monohexyl maleate), dihexyltin bis-(monoisooctyl maleate), dibutyltin bis-(monocetyl maleate), dibutyltin bis-(monooctadecyl maleate), dibutyltin bis-(monoallyl maleate), dibutyltin bis-(monohexynyl maleate), dibutyltin bis-(mono-2-ethoxyethyl maleate), dioctyltin bis-(monocyclohexyl maleate), dihexyltin bis-(monobenzyl maleate), butylhexyltin bis-(mono - tert.butylbenzyl maleate), butylhexyltin bis-(mono-2-hydroxymethyl-5-norbornyl maleate), and the like and mixtures thereof.

The organotin carboxylates may be prepared by any suitable and convenient procedure. For example, they may be prepared by reacting a dialkyltin oxide with the appropriate monocarboxylic acid or by reacting a dialkyltin dichloride with an alkali metal salt of a monocarboxylic acid.

In most cases the stabilizers of this invention will contain approximately 60 percent to 95 percent by weight of the organotin mercaptoacid ester and 5 percent to 40 percent by weight of the organotin carboxylate. Particularly advantageous results have been obtained using a stabilizer that contained 80 percent to 90 percent by weight of the organotin mercaptoacid ester and 10 percent to 20 percent by weight of the organotin carboxylate.

The novel stabilizers may be prepared by adding to the organotin mercaptoacid ester an amount of the organotin carboxylate that is sufficient to inhibit the decomposition of the mercaptoacid ester and to minimize the precipitation of crystalline decomposition products therein. In most cases the amount of organotin carboxylate added is approximately 5 parts to 70 parts by weight per 100 parts by weight of the mercaptoacid ester, with optimum results being obtained when 10 parts to 25 parts by weight of the organotin carboxylate is added per 100 parts by weight of the organotin mercaptoacid ester. When a liquid organotin carboxylate is used, it is simply mixed with the organotin mercaptoacid ester at room temperature; when a solid organotin carboxylate, such as dibutyltin distearate, is used, the organotin compounds are generally mixed together at room temperature, and mixture is heated at a temperature in the range of approximately 160° F. to 180° F. until a clear solution is obtained and then cooled.

The vinyl halide resins that may be stabilized with the organotin stabilizers of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers, including those formed by the polymerization of a vinyl halide with a comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those that contain at least 70 percent of vinyl halide units and up to 30 percent of the comonomer units. The invention is also applicable to mixtures of vinyl halide resins in a major proportion with a minor proportion of another synthetic resin, such as chlorinated polyethylene, polyacrylate and polymethacrylate esters, and terpolymers of acrylonitrile, butadiene, and styrene. In addition to the vinyl halide resin and stabilizer, the compositions may also contain plasticizers such as dioctyl phthalate, dibutyl sebacate, tricresyl phosphate, and octyl diphenyl phosphate, lubricants, other heat and light stabilizers such as epoxidized oils and polyhydric alcohols, pigments, dyes, extenders, solvents, and other resin additives in the amounts ordinarily employed for the purpose indicated.

Only a small amount of the novel stabilizer need be present in the vinyl halide resin compositions of this invention. It has been found that as little as 1 percent of the stabilizer, based on the weight of the composition, will bring about an appreciable improvement in the heat and light stability of the composition. Approximately 10 percent or more of the stabilizer can be used, but these larger amounts generally do not provide further improvement in the properties of the resinous composition and for this reason are not ordinarily used. While the amount of the stabilizer that will provide optimum stability depends upon such factors as the choice of stabilizer and the choice of vinyl halide resin, in most cases 2 percent to 6 percent of the stabilizer, based on the weight of the vinyl halide resin composition, is used.

The stabilized vinyl halide resin compositions are generally prepared by blending the stabilizer with the vinyl halide resin using plastic mixing rolls at a temperature at which the mixture is fluid and milling the composition on a two-roll mill at from 300° F. to 400° F. for a time sufficient to form a homogeneous sheet. The plasticizer and other additives may be incorporated with the stabilizer. The stabilized composition may then be removed from the mill in the form of a sheet or film of the desired thickness which may be used as such or subjected to a polishing or embossing treatment.

The heat stability of these stabilized compositions was determined by placing 1 x 1 inch specimens which had been cut from the milled sheets in a circulating air oven at 375° F. and removing specimens periodically until degradation was complete as indicated by color change.

The invention is further illustrated by the examples that follow. In these examples, all parts are parts by weight unless otherwise specified.

EXAMPLE 1

A mixture of 2564 parts of isooctyl thioglycolate which had been prepared by the esterification of thioglycolic acid with isooctanol, 1548 parts of dibutyltin oxide, and 1560 parts of benzene was heated at its reflux temperature (90°–95° C.) until 109 parts of water had been collected by azeotropic distillation. The reaction mixture was then heated to 90° C./37–58 mm. to remove the benzene. The product was cooled and filtered. The dibutyltin bis-(isooctyl thioglycolate) obtained was a clear, water-white liquid. After standing at room temperature for three days, this product contained a substantial amount of a white crystalline precipitate.

EXAMPLE 2

A freshly-made 180 gram sample of dibutyltin bis-(isooctyl thioglycolate), which had been made by the procedure of Example 1, was mixed at room temperature with 20 grams of dibutyltin bis-(monoisooctyl maleate). The resulting mixture was a clear solution that remained clear at room temperature for several months.

EXAMPLE 3

A freshly-made 180 gram sample of dibutyltin bis-(isooctyl thioglycolate), which had been made by the procedure of Example 1, was mixed at room temperature with 20 grams of dibutyltin bis-(neodecanoate). The resulting mixture was a clear solution that remained clear on standing at room temperature for several months.

EXAMPLE 4

A freshly-made 180 gram sample of dibutyltin bis-(isooctyl thioglycolate), which had been made by the procedure of Example 1, was mixed at room temperature with 20 grams of dibutyltin dipelargonate. The resulting mixture was a clear solution that remained clear on standing at room temperature for several months.

EXAMPLE 5

Stabilized polyvinyl chloride resin compositions were prepared by the following procedure:

To a mixture of 100 parts of polyvinyl chloride (Tenneco 200) and 0.2 part of lubricant waxes was added 2 parts of either a stabilizer of this invention or a comparative stabilizer. The lubricant wax component was made up of equal parts of synthetic long chain fatty acids partially saponified with calcium (Hoechst GL-3) and an ester of montan wax partially saponified with calcium (Hoechst OP). The mixtures were blended at room temperature and then charged to a two-roll, steam-heated mill whose surface was maintained at 340° F. The mixtures were milled for 5 minutes and then removed from the rolls as flexible, homogeneous sheets, 45 mils thick. The heat stability of the compositions was determined by placing 1 x 1 inch specimens which had been cut from the milled sheets in a forced-circulation oven at 375° F. and removing specimens periodically until degradation was complete as indicated by color change. The results obtained may be summarized as follows:

TABLE I

| Ex. No. | Stabilizer | Time required to degrade specimens at 375° F., min. |
|---|---|---|
| 5A | Product of Example 2—[90% dibutyltin bis-(isooctyl thioglycolate) and 10% dibutyltin bis-(monoisooctyl maleate)]. | 80 |
| 5B | Comparative stabilizer—[dibutyltin bis-(isooctyl thioglycolate)]. | 70 |
| 5C | Comparative stabilizer—[90% dibutyltin bis-(isooctyl thioglycolate) and 10% zinc octoate]. | 20 |

EXAMPLE 6

Stabilized polyvinyl chloride resin compositions were prepared by the following procedure:

To a mixture of 100 parts of polyvinyl chloride (Tenneco 10R), 15 parts of an acrylonitrile-butadiene-styrene terpolymer (Blendex 401), 4 parts of an acrylic polymer (K–120N), 1.35 parts of glyceryl monoricinoleate, 0.5 part of stearyl stearate, and 0.001 part of blue dye was added 2 parts of either a stabilizer of this invention, or a comparative stabilizer. The mixtures were blended at room temperature and then charged to a two-roll, steam-heated mill whose roll surface was maintained at 340° F. The mixtures were milled for 5 minutes and then removed from the mill as flexible, homogeneous sheets 45 mils thick. The heat stability of the compositions was determined by the procedure described in Example 5. The results obtained may be summarized as follows:

TABLE II

| Ex. No. | Stabilizer | Time required to degrade specimens at 375° F., min. |
|---|---|---|
| 6A | Product of Example 2 | 80 |
| 6B | Product of Example 3 | 80 |
| 6C | Product of Example 4 | 80 |
| 6D | Comparative stabilizer—[dibutyltin bis-(isooctyl thioglycolate)]. | 80 |
| 6E | Comparative stabilizer—[90% dibutyltin bis-(isooctyl thioglycolate) and 10% barium monylphenate]. | 60 |

From the data in Tables I and II it will be seen that the compositions containing the stabilizers of this invention (Ex. Nos. 5A, 6A, 6B, and 6C) were at least as stable at 375° F. as those containing as stabilizer untreated dibutyltin bis-(isooctyl thioglycolate) (Ex. Nos. 5B and 6D), whereas those containing the comparative stabilizers which contained 90% of dibutyltin bis-(isooctyl thioglycolate) and 10% of either zinc octoate or barium nonylphenate (Ex. Nos. 5C and 6E) were appreciably less stable than the untreated dibutyltin bis-(isooctyl thioglycolate).

EXAMPLE 7

A series of stabilizers was prepared which contained 90% of dibutyltin bis-(isooctyl thioglycolate) and 10% of a dibutyltin carboxylate. When the dibutyltin carboxylate was a liquid, the mixtures were prepared by mixing the organotin compounds together at room temperature; when the dibutyltin carboxylate was a solid at room temperature, the mixtures were heated at 160° F. to 180° F. until a clear solution was obtained, cooled, and allowed to stand at room temperature for 5 days. The results obtained are summarized in Table III.

vinyl halide resin compositions and to retain its activity as a stabilizer over a long period of time.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A stabilizer composition for vinyl halide resin compositions that comprises (a) approximately 60 percent to 95 percent by weight of an organotin mercaptoacid ester having the structural formula $$R_nSnX_{4-n}$$

wherein R represents a member selected from the group consisting of alkyl oxyalkyl, aryl, oxyaryl, and cycloalkyl groups, X represents an ester of a mercaptoacid having from 2 to 6 carbon atoms, whose sulfur atom is linked to the tin atom, and $n$ is a number in the range of 1 to 3; and (b) approximately 5 percent to 40 percent by weight of an organotin carboxylate having the structural formula $$\begin{array}{c} R° \\ \diagdown \\ \diagup \\ R° \end{array} Sn \begin{array}{c} O \\ \diagup \overset{\|}{O\,C}-R'' \\ \diagdown \underset{\|}{O\,C}-R'' \\ O \end{array}$$

wherein each R° represents an alkyl group having from 4 to 8 carbon atoms; each R'' represents a member selected from the group consisting of alkyl groups having from 8 to 17 carbon atoms, alkenyl groups having from 8 to 17 carbon atoms, and the group $$-CH=CH-\overset{O}{\underset{\|}{C}}-OR'''$$

and R''' represents a member consisting of alkyl groups having from 1 to 18 carbon atoms, cycloaliphatic groups, alkenyl groups having from 2 to 18 carbon atoms, and aralkyl groups.

2. A stabilizer composition for vinyl halide resin compositions as set forth in claim 1 that comprises (a) 80 percent to 90 percent by weight of an organotin mercaptoacid ester having the structural formula $$R°_nSn(SCH_2COOR')_{4-n}$$

wherein R° represents an alkyl group having from 4 to 8 carbon atoms; R' represents a member selected from the group consisting of alkyl, aryl, aralkyl, alkaryl, and cycloalkyl groups; and $n$ is a number in the range of 1 to 3

TABLE III

| Ex. No. | Dibutyltin carboxylate, used | Physical state of dibutyltin carboxylate | Appearance of 90/10 mixture of dibutyltin bis-(isooctyl thioglycolate) / dibutyltin carboxylate after 5 days at room temperature |
|---|---|---|---|
| 7A | Dibutyltin bis-(monopropyl maleate) | Liquid | Clear solution. |
| 7B | Dibutyltin bis-(monoisooctyl maleate) | do | Do. |
| 7C | Dibutyltin bis-(monoiso hexadecyl maleate) | do | Do. |
| 7D | Dibutyltin bis-(monocetyl maleate) | Solid | Do. |
| 7E | Dibutyltin bis-(monoallyl maleate) | Liquid | Do. |
| 7F | Dibutyltin bis-(mono-2-ethoxyethyl maleate) | do | Do. |
| 7G | Dibutyltin bis-(monocyclohexyl maleate) | Solid | Do. |
| 7H | Dibutyltin bis-(monohexynyl maleate) | Liquid | Do. |
| 7I | Dibutyltin bis-(mono-2-hydroxymethyl-5-norbornyl maleate). | do | Do. |
| 7J | Dibutyltin bis-(monobenzyl maleate) | do | Do. |
| 7K | Dibutyltin bis-(neopentanoate) | Solid | Do. |
| 7L | Dibutyltin bis-(2-ethylhexoate) | do | Do. |
| 7M | Dibutyltin distearate | do | Do. |
| 7N | None | | Solution containing a substantial amount of white crystalline precipitate. |

After 1 month's storage at room temperature each of the compositions 7A–7M was clear except for a few small crystals on the bottom of the container. Each of these compositions was found to be effective as a stabilizer for and (b) 10 percent to 20 percent by weight of said organotin carboxylate.

3. A stabilizer composition for vinyl halide resin compositions as set forth in claim 2 wherein the organotin mercaptoacid ester is dibutyltin bis-(isooctyl thioglycolate).

4. A stabilizer composition for vinyl halide resin compositions as set forth in claim 3 wherein the organotin carboxylate is dibutyltin bis-(monoisooctyl maleate).

5. A stabilizer composition for vinyl halide resin compositions as set forth in claim 3 wherein the organotin carboxylate is dibutyltin dipelargonate.

6. A stabilizer composition for vinyl halide resin compositions as set forth in claim 3 wherein the organotin carboxylate is dibutyltin bis-(neodecanoate).

7. A stabilizer composition for vinyl halide resin compositions as set forth in claim 3 wherein the organotin carboxylate is dibutyltin bis-(mono-n-propyl maleate).

8. A method for the stabilization of an organotin mercaptoacid ester having the structural formula

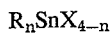

wherein R represents a member selected from the group consisting of alkyl, oxyalkyl, aryl, oxyaryl, and cycloalkyl groups, X represents an ester of a mercaptoacid having from 2 to 6 carbon atoms, whose sulfur atom is linked to the tin atom, and $n$ is a number in the range of 1 to 3 which comprises mixing said ester with an amount that is sufficient to inhibit the decomposition of said ester of an organotin carboxylate having the structural formula

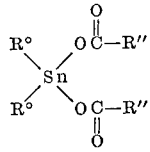

wherein each R° represents an alkyl group having from 4 to 8 carbon atoms; each R" represents a member selected from the group consisting of alkyl groups having from 8 to 17 carbon atoms, alkenyl groups having from 8 to 17 carbon atoms, and the group

and R''' represents a member selected from the group consisting of alkyl groups having from 1 to 18 carbon atoms, cycloaliphatic groups, alkenyl groups having from 2 to 18 carbon atoms, and aralkyl groups.

9. The method of claim 8 wherein the organotin mercaptoacid ester is dibutyltin bis-(isooctyl thioglycolate).

10. The method of claim 9 wherein approximately 5 part to 70 parts by weight of said organotin carboxylate is added per 100 parts by weight of dibutyltin bis-(isooctyl thioglycolate).

11. The method of claim 9 wherein approximately 10 parts to 25 parts by weight of dibutyltin bis-(monoisooctyl maleate) is added per 100 parts by weight of dibutyltin bis-(isooctyl thioglycolate).

12. The method of claim 9 wherein approximately 10 parts to 25 parts by weight of dibutyltin dipelargonate is added per 100 parts by weight of dibutyltin bis-(isooctyl thioglycolate).

13. The method of claim 9 wherein approximately 10 parts to 25 parts by weight of dibutyltin bis-(neodecanoate) is added per 100 parts by weight of dibutyltin bis-(isooctyl thioglycolate).

14. The method of claim 9 wherein approximately 10 parts to 25 parts by weight of dibutyltin bis-(mono-n-propyl maleate) is added per 100 parts by weight of dibutyltin bis-(isooctyl thioglycolate).

15. The method of claim 8 wherein the mixture of the organotin mercaptoacid ester and a solid organotin carboxylate is heated at a temperature in the range of approximately 160° F. to 180° F. until a clear solution is obtained and then cooled.

References Cited
UNITED STATES PATENTS

| | | | |
|---|---|---|---|
| 2,307,157 | 1/1943 | Quattlebaum et al | 260—45.75X |
| 2,832,750 | 4/1958 | Weinberg et al. | 260—429.7X |
| 2,914,506 | 11/1959 | Mack et al. | 260—429.7X |
| 3,189,575 | 6/1965 | Horn et al. | 260—45.75 |

TOBIAS E. LEVOW, Primary Examiner

W. F. W. BELLAMY, Assistant Examiner

U.S. Cl. X.R.

260—45.75